(12) United States Patent
Trönnberg et al.

(10) Patent No.: US 8,589,048 B2
(45) Date of Patent: Nov. 19, 2013

(54) METHOD OF CONTROLLING A TORQUE VECTORING MECHANISM AND TORQUE VECTORING SYSTEM

(75) Inventors: Gabriel Per Erik Ivar Trönnberg, Trollhättan (SE); Simon Ola André Yngve, Trelleborg (SE)

(73) Assignee: e-AAM Driveline Systems AB, Trollhättan (SE)

( * ) Notice: Subject to any disclaimer, the term of this patent is extended or adjusted under 35 U.S.C. 154(b) by 266 days.

(21) Appl. No.: 13/220,854

(22) Filed: Aug. 30, 2011

(65) Prior Publication Data

US 2012/0053806 A1    Mar. 1, 2012

Related U.S. Application Data (60) Provisional application No. 61/378,093, filed on Aug. 30, 2010.

(51) Int. Cl.
*G06G 7/70* (2006.01)
(52) U.S. Cl.
USPC .............. 701/70; 475/6; 475/206; 475/225; 701/58
(58) Field of Classification Search
USPC ................... 475/6, 206, 225; 701/58
See application file for complete search history.

(56) References Cited

U.S. PATENT DOCUMENTS

| 5,882,092 | A | 3/1999 | Koibuchi |
| 7,186,199 | B1* | 3/2007 | Baxter, Jr. ............. 475/206 |
| 2001/0042652 | A1 | 11/2001 | Watson et al. |
| 2006/0025267 | A1* | 2/2006 | Gradu ....................... 475/6 |
| 2006/0025273 | A1* | 2/2006 | Gradu ..................... 475/225 |
| 2009/0272592 | A1 | 11/2009 | Gaffney |
| 2010/0161194 | A1 | 6/2010 | Turski et al. |
| 2011/0087409 | A1* | 4/2011 | Severinsson et al. ..... 701/58 |

FOREIGN PATENT DOCUMENTS

| DE | 102005033995 A1 | 2/2007 |
| DE | 102007051590 A1 | 4/2009 |
| DE | 102008021532 A1 | 11/2009 |
| EP | 1985827 A1 | 10/2008 |

OTHER PUBLICATIONS

Malcolm Burgess: "Torque Vectoring", Oct. 14, 2009.

(Continued)

*Primary Examiner* — James Trammell
*Assistant Examiner* — Sanjeev Malhotra
(74) *Attorney, Agent, or Firm* — Harness, Dickey & Pierce, P.L.C.

(57) ABSTRACT

A method of controlling a torque vectoring mechanism that distributes torque between a left and a right wheel of a vehicle includes determining a reference yaw rate of the vehicle based on a speed and a steering angle of the vehicle and determining a first torque control value based on a yaw rate of the vehicle and the reference yaw rate. The method also includes: (i) determining longitudinal slip value for each of the left and right wheels, (ii) determining a combined slip value based on the longitudinal slip values, and (iii) determining a second torque control value based on the combined slip value. Further, the method includes determining a final torque control value based on the first torque control value and the second torque control value and distributing torque between the left and right wheels based on the final torque control value. A torque vectoring system is also provided.

20 Claims, 4 Drawing Sheets

(56) References Cited

OTHER PUBLICATIONS

"Automotive Handbook", Sep. 30, 2000, Robert Bosch GmbH.

Slavnich D: "Honda Talks the Torque", Autmotive Engineer, Professional Engineering Publishing.

Anne Von Vietinghoff: "Nichtlineare Regelung von Kraftfahrzeugen in querdynamisch kritischen Fahrsituationen", Dec. 31, 2008.

* cited by examiner

METHOD OF CONTROLLING A TORQUE VECTORING MECHANISM AND TORQUE VECTORING SYSTEM

CROSS-REFERENCE TO RELATED APPLICATIONS

This application claims the benefit of U.S. Provisional Application No. 61/378,093, filed on Aug. 30, 2010. The entire disclosure of the above application is incorporated herein by reference.

TECHNICAL FIELD

The present disclosure relates to a control of a vehicle and, more specifically, a method of controlling a torque vectoring mechanism and a related torque vectoring system.

BACKGROUND

Vehicle handling and stability have been important areas of research for quite some time due to an increased focus on traffic safety and because of customer demand. Two common types of unstable conditions that a vehicle, such as a car, may encounter are referred to as oversteering and understeering. Oversteering is the situation where the rear end of the vehicle moves towards the outside of a turn instead of following the curvature of the turn. Understeering is the opposite situation where the front end of the vehicle moves towards the outside of the turn instead of following the curvature of the turn.

There exist several ways of controlling the vehicle in order to counteract an oversteer or an understeer condition. For example, a torque vectoring mechanism may be used to distribute a torque between a left and a right rear wheel and in this way counteract the understeer or oversteer condition. More specifically, if the vehicle is subject to understeer in a turn, the torque vectoring mechanism may be controlled to increase the torque on the outer rear wheel. Conversely, if the vehicle is subject to oversteer in a turn, the torque vectoring mechanism may be controlled to increase the torque of the inner rear wheel.

A general problem with using torque vectoring mechanisms for improving stability of a vehicle is that the understeer or oversteer condition may grow worse if too much longitudinal force is applied to the wheels coupled to the torque vectoring mechanism. In a case where the torque vectoring mechanism is coupled to the rear wheels, an oversteer condition may be aggravated. This is due to the fact that as a driving force or a torque is applied to the rear wheels, the lateral force capacity of the rear axle decreases and at some point the lateral force capacity of the rear axle saturates. As a result, the oversteer condition gets worse, decreasing the stability of the vehicle. In a case where the torque vectoring mechanism is instead coupled to the front wheels, an understeer condition may be aggravated. Similarly to the case of the rear wheels, as a driving force or torque is applied to the front wheels, the lateral force capacity of the front axle decreases and at some point the lateral force capacity of the front axle saturates. As a result, the understeer condition gets worse and the stability of the vehicle decreases.

There is a need for a method for controlling a torque vectoring mechanism, as well as a torque vectoring system, that provides improved performance.

SUMMARY

In accordance with various embodiments of the present disclosure, a method of controlling a torque vectoring mechanism that distributes torque between a left wheel and a right wheel of a vehicle is disclosed. The method includes receiving a first signal indicative of a yaw rate of the vehicle and determining a reference yaw rate of the vehicle based on a speed and a steering angle of the vehicle. The method further includes determining a first lateral force capacity of the left wheel, the first lateral force capacity being based on an estimated maximum of lateral force that can be supported by the left wheel. The method also includes determining a second lateral force capacity of the right wheel, the second lateral force capacity being based on an estimated maximum of lateral force that can be supported by the right wheel. Additionally, the method includes determining a torque control value based on the first signal, the reference yaw rate, the first lateral force capacity and the second lateral force capacity. Finally, the method includes distributing torque between the left wheel and the right wheel based on the torque control value.

In accordance with various embodiments of the present disclosure, a system that distributes torque between a left wheel and a right wheel of a vehicle is disclosed. The system includes a torque vectoring mechanism that distributes torque between a left wheel and a right wheel of a vehicle based on a torque control value and a controller that provides the torque control value to the torque vectoring mechanism. The controller determines the torque control value by: receiving a first signal indicative of a yaw rate of the vehicle; determining a reference yaw rate of the vehicle based on a speed and a steering angle of the vehicle; determining a first lateral force capacity of the left wheel, the first lateral force capacity being based on an estimated maximum of lateral force that can be supported by the left wheel; determining a second lateral force capacity of the right wheel, the second lateral force capacity being based on an estimated maximum of lateral force that can be supported by the right wheel; and determining the torque control value based on the first signal, the reference yaw rate, the first lateral force capacity and the second lateral force capacity.

In accordance with various embodiments of the present disclosure, a method of controlling a torque vectoring mechanism that distributes torque between a left wheel and a right wheel of a vehicle is disclosed. The method includes determining a reference yaw rate of the vehicle based on a speed and a steering angle of the vehicle and determining a first torque control value based on a yaw rate of the vehicle and the reference yaw rate. The method also includes: determining a first longitudinal slip value of the left wheel, determining a second longitudinal slip value of the right wheel, determining a combined slip value based on the first longitudinal slip value and the second longitudinal slip value, and determining a second torque control value based on the combined slip value. Further, the method includes determining a final torque control value based on the first torque control value and the second torque control value and distributing torque between the left wheel and the right wheel based on the final torque control value.

In accordance with various embodiments of the present disclosure, a system that distributes torque between a left wheel and a right wheel of a vehicle is disclosed. The system includes a torque vectoring mechanism that distributes torque between a left wheel and a right wheel of a vehicle based on a torque control value and a controller that provides the torque control value to the torque vectoring mechanism. The controller determines the final torque control value by: determining a reference yaw rate of the vehicle based on a speed and a steering angle of the vehicle, determining a first torque control value based on a yaw rate of the vehicle and the reference yaw rate, determining a first longitudinal slip value of the left wheel, determining a second longitudinal slip value of the right wheel, determining a combined slip value based on the first longitudinal slip value and the second longitudinal slip value, determining a second torque control value based on the combined slip value, and determining the final torque control value based on the first torque control value and the second torque control value.

BRIEF DESCRIPTION OF THE DRAWINGS

The above, as well as additional objects, features and advantages of the present invention, will be better understood through the following illustrative and non-limiting detailed description of embodiments of the present invention, with reference to the appended drawings, where the same reference numerals will be used for similar elements, wherein.

DETAILED DESCRIPTION

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
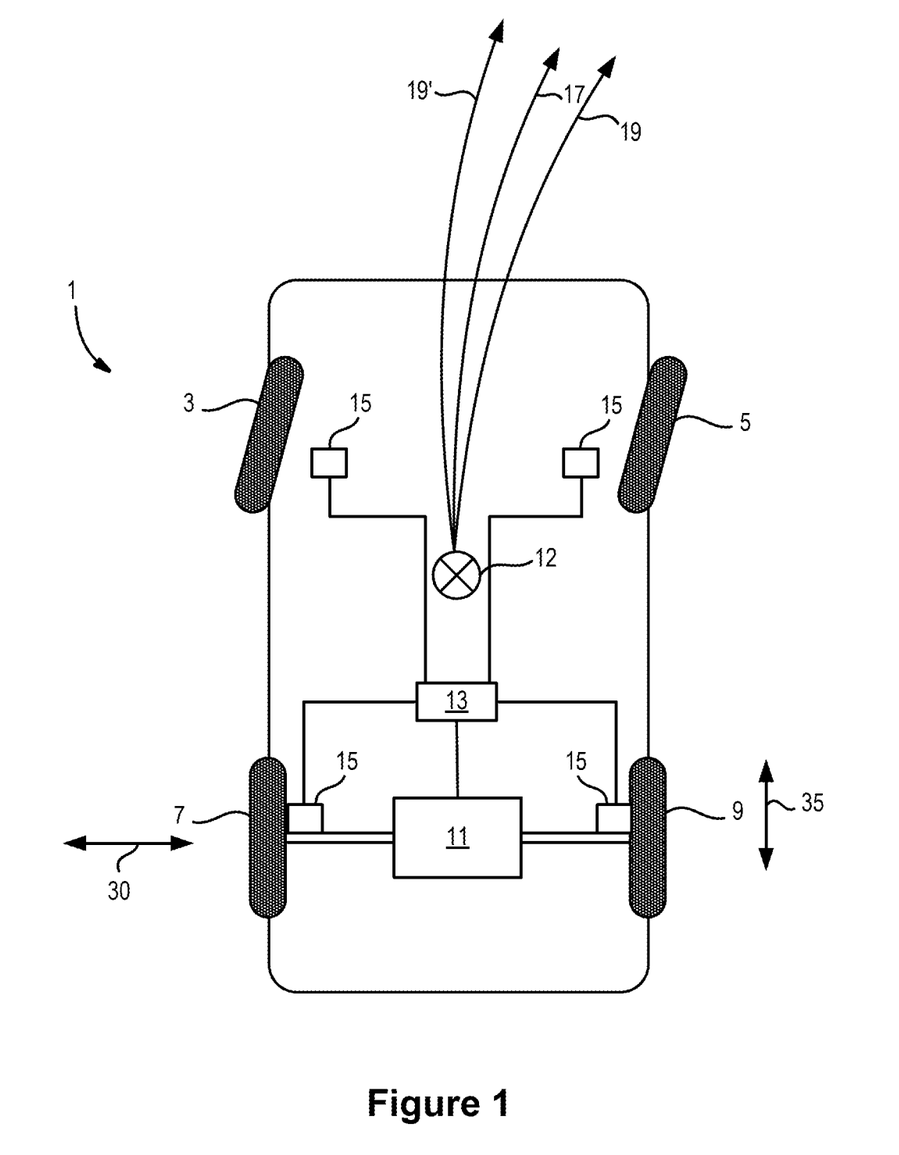
FIG. 1 schematically illustrates a top view of a vehicle including a system for controlling a torque vectoring mechanism according to some embodiments of the present disclosure.

Referring now to FIG. 1, a motorized vehicle 1 according to some embodiments of the present disclosure is illustrated. The vehicle 1 includes a left front wheel 3, a right front wheel 5, a left rear wheel 7, and a right rear wheel 9. The vehicle is typically driven by a main drive source, such as a combustion engine or electric motor, that provides rotary power to the front wheels 3, 5 ("front-wheel drive"), the rear wheels 7, 9 ("rear wheel drive") or to both the front and rear wheels ("all-wheel drive" or "four-wheel drive"). While the vehicle 1 is illustrated in FIG. 1 as having a main drive source with a front-wheel drive configuration, the system and method described below can be applied to a vehicle having a main drive source with a rear-wheel drive configuration or a four-wheel drive configuration with minor modifications.

The vehicle 1 includes a torque vectoring system that comprises a torque vectoring mechanism 11 and a controller 13. In the illustrated example, the torque vectoring mechanism 11 is mounted, and arranged to distribute torque, between the wheels that are not connected to the main drive source, that is, the torque vectoring mechanism 11 is mounted between the rear wheels 7, 9. In some embodiments, the torque vectoring mechanism 11 may be arranged to apply counter-directed torques to the left and to the right rear wheels 7, 9. For example only, a torque of a certain direction and magnitude may be applied to the left rear wheel 7 and a torque having the same magnitude (or a different magnitude) but the opposite direction may be applied to the right rear wheel 9. One example torque vectoring mechanism is disclosed in U.S. Ser.

No. 13/182,153 filed Jul. 13, 2011, the disclosure of which is hereby incorporated by reference as if set forth in its entirety herein.

In order to distribute a torque between the left and right rear wheels 7, 9, the torque vectoring mechanism 11 may comprise a differential (not shown), which can comprise differential gearing (not shown), and a means for generating a torque difference. The torque difference generating means can comprise brakes, clutches, motors, reversing gears and/or any other means for selectively inputting additional torque and/or removing torque from that which is otherwise transmitted through the rear wheels 7, 9 to the road surface. In the particular example provided, the torque difference generating means comprises an auxiliary drive mechanism (not shown), such as an electric motor. The auxiliary drive mechanism may generate a torque that is distributed to the left and right rear wheels 7, 9, for example, via the gearing mechanism of the active rear differential. Other forms of a torque vectoring mechanism 11 can be utilized, such as individual wheel motors that are connected, and directly distribute torque, to the rear wheels 7, 9.

The controller 13 can be configured to control the torque vectoring mechanism 11. As used herein, the term controller refers to an application specific integrated circuit (ASIC), an electronic circuit, a processor (shared, dedicated or group) and memory that executes one or more software or firmware programs, a combinational logic circuit, or other suitable components that provide the described functionality. In some embodiments, the controller 13 can be configured to determine and transmit to the torque vectoring mechanism 11 a torque control signal indicative of the torque to be distributed to the left and right rear wheels 7, 9.

The controller 13 may further be coupled to sensors 15 mounted on the vehicle 1 that are configured to measure various parameters related to a substantially present or real-time condition of the vehicle 1, such as wheel speeds, vehicle yaw rate, vehicle speed, and steering angle. These measured parameters can be employed by the controller 13 to generate the torque control signal, as further described below.

Figure 2:
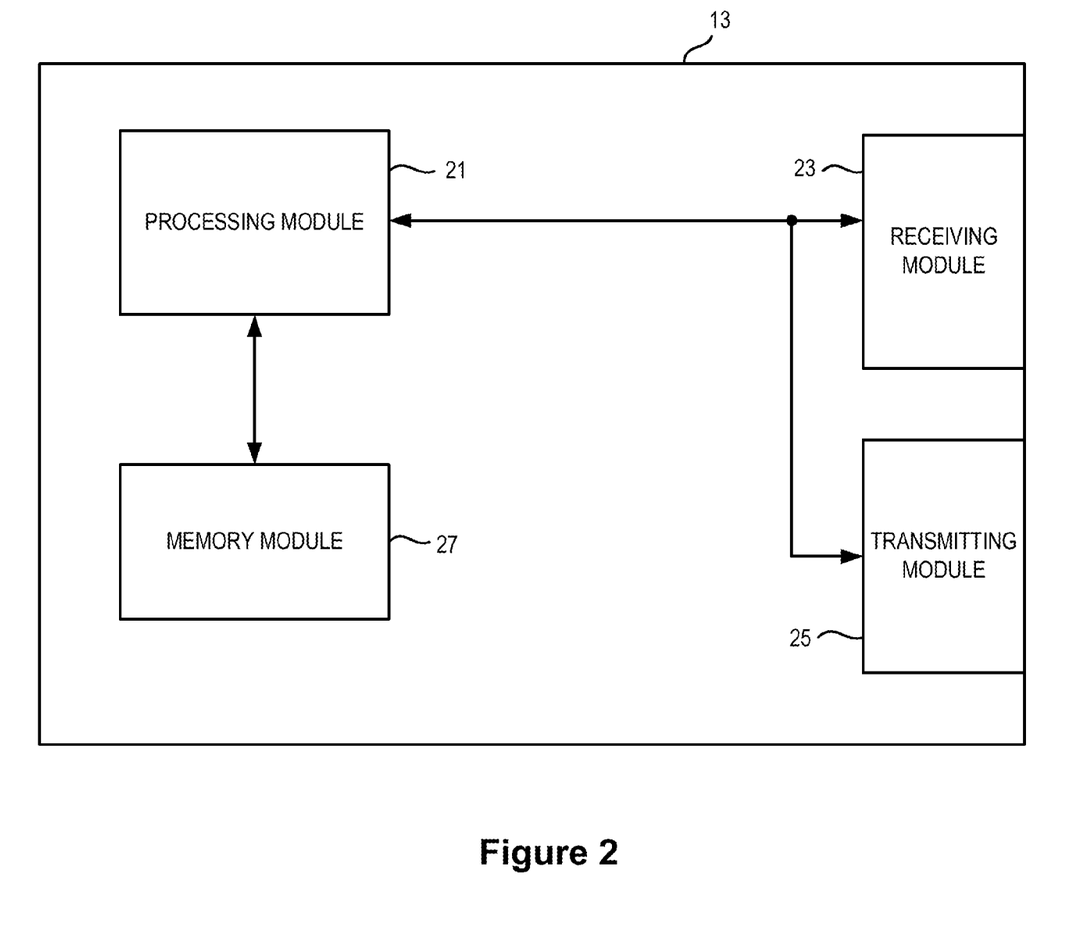
FIG. 2 is a block diagram illustrating an exemplary controller of the system for controlling a torque vectoring mechanism of FIG. 1 illustrates internal components of a controller according to an embodiment of the invention.

An exemplary embodiment of the controller 13 is illustrated in more detail in FIG. 2. The controller 13 includes a processing module 21, a receiving module 23, a transmitting module 25 and a memory module 27. The receiving module 23 can be configured to receive data signals from external units, devices and apparatuses in any known manner. For example, the receiver module 23 may be arranged to receive data signals from the sensors 15. Similarly, the transmitter module 25 can be configured to transmit data signals to external units, devices, and apparatuses in any known manner. In some embodiments, the receiver module 23 and the transmitter module 25 can be part of a common transceiver configured to both receive and transmit data signals.

The memory module 27 can be configured to store software instructions pertaining to a computer-implemented method for controlling the torque vectoring mechanism 11 of the vehicle 1. The memory module 27 can thus form a computer-readable medium upon which software instructions can be stored. The software instructions may cause the processing module 21 to execute a method according to various embodiments of the present disclosure.

Referring again to FIG. 1, the vehicle 1 is shown in an oversteer situation, meaning that the rear wheels 7, 9 have lost grip in a turn while the front tires 3, 5 are still gripping. Consequently, the rear end of the vehicle 1 moves (or "slides") toward the outside of the turn in an oversteer situation such that the actual path 19 of the vehicle 1 "undershoots" a desired vehicle path 17 (i.e., a path that the vehicle 1 would traverse if the rear wheels 7, 9 had retained their grip through the turn). Throughout this description, the right rear wheel 9 may be described as the inner rear wheel and the left rear wheel 7 may be described as the outer rear wheel because the vehicle 1 is depicted in FIG. 1 as going through a turn to the right. It will be appreciated, however, that were the vehicle 1 to be in an oversteer situation while in a turn to the left, the left rear wheel 7 would be the inner rear wheel and the right rear wheel 9 would be the outer rear wheel.

In some situations, the oversteering of the vehicle 1 can be counteracted in part or in whole by increasing the driving force or torque on the inner rear wheel (the right rear wheel 9 in the situation shown in FIG. 1). In other situations, increasing the driving force on the inner rear wheel can make the situation worse by increasing the oversteer of the vehicle 1. Oversteer can be a result of the lateral force (that is, the force in the lateral direction 30) exerted upon one or both of the rear wheels that is required to maintain the vehicle along the desired path (for example, desired path 17) being greater than the lateral force capacity of the wheel(s). Increasing the longitudinal driving force (that is, the force in the longitudinal direction 35) on the inner rear wheel may increase the longitudinal slip of inner rear wheel, which may reduce the lateral force capacity of inner rear wheel and cause the vehicle 1 to further oversteer.

In some embodiments of the present disclosure, in order to counteract oversteer of the vehicle the longitudinal driving force or the torque applied to the inner rear wheel can be controlled such that it as high as needed to counteract the oversteering, except for in situations in which the required torque would increase oversteer. In situations in which the required torque would increase oversteer, the longitudinal driving force applied to the inner rear wheel can be limited to a level that approximates the maximum amount of torque that can be applied to the wheel without increasing oversteer.

One skilled in the art will recognize that an understeer situation, in which the front end of the vehicle 1 moves towards the outside of the turn such that the vehicle 1 follows the path 19' instead of the desired path 17, is similar to an oversteer situation and may be counteracted in a similar manner. With respect to the vehicle 1 in an understeer situation, the understeer can be counteracted by increasing the torque on the outer rear wheel (i.e., the left rear wheel 7 in the example of FIG. 1). Additionally, the situation can be made worse if too much torque is applied, e.g., due to increased longitudinal slip of the outer rear wheel.

Alternatively, if the torque vectoring mechanism 11 instead were mounted at the front wheels 3, 5, understeer may be counteracted by increasing the torque on the outer front wheel (left front wheel 3) and decreasing the torque on the inner front wheel (right front wheel 5). Similarly, oversteer may be counteracted by increasing the torque on the inner front wheel (right front wheel 5) and decreasing the torque on the outer front wheel (left front wheel 3).

Figure 3:
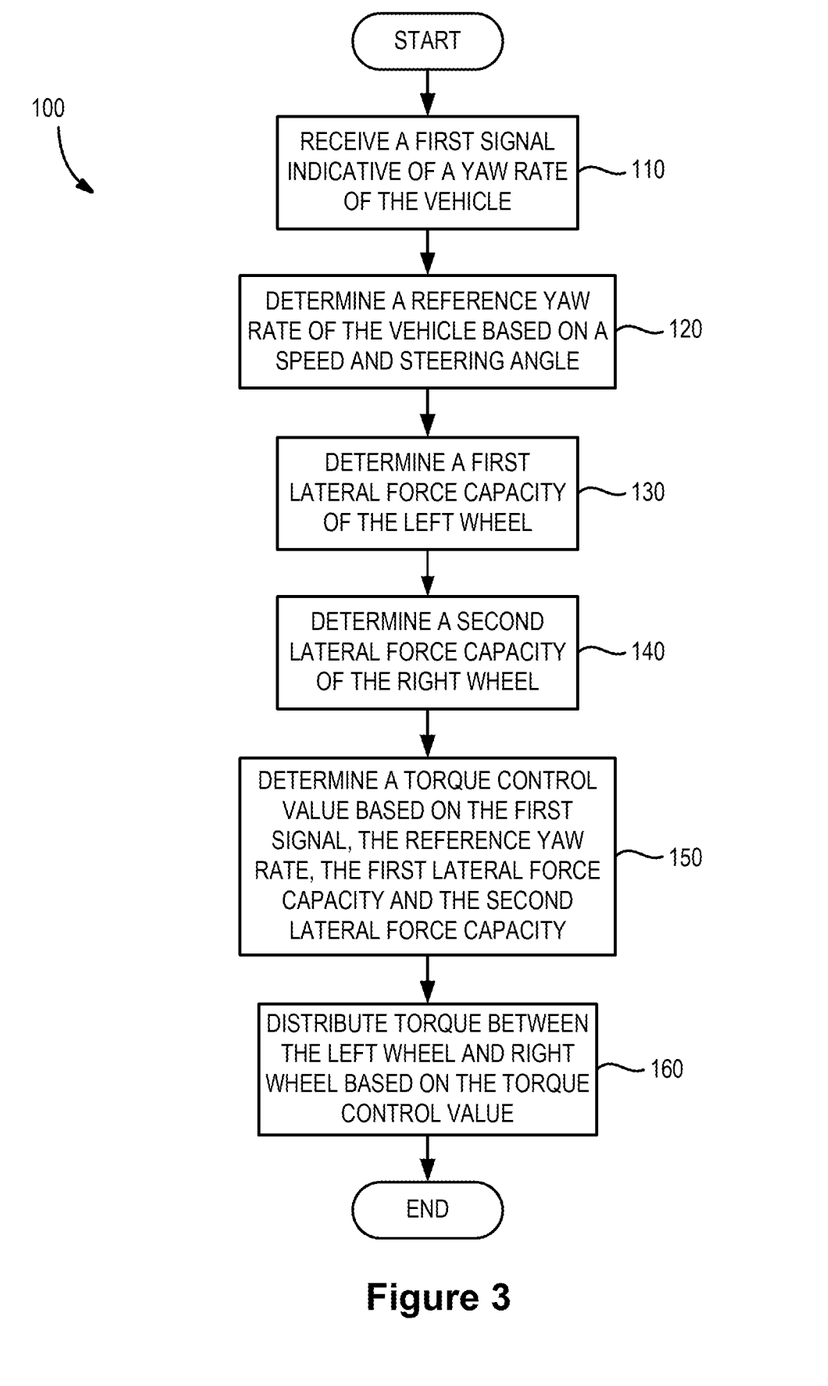
FIG. 3 is a flowchart describing an exemplary method for controlling a torque vectoring mechanism according to some embodiments of the present disclosure.

Referring now to FIG. 3, a flowchart illustrating an exemplary method 100 for controlling a torque vectoring mechanism 11 of a vehicle 1 according to some embodiments of the present disclosure is shown. The method 100 can, for example only, be performed by the controller 13 to control the torque vectoring mechanism 11 of the vehicle 1.

In box 110, a signal indicative of the yaw rate of the vehicle 1 can be received, e.g., by the controller 13. The yaw rate of the vehicle 1 is a measure of the angular velocity of the vehicle 1 around a vertical axis, which typically extends through the center of gravity 12 of the vehicle 1. There are many different ways to receive a signal indicative of the yaw rate of the vehicle 1. For example only, the signal could be transmitted by one of the sensors 15 and received by the receiving module 23 of the controller 13. Alternatively, the signal can be generated by the processing module 21, for example, based on inputs from the receiving module 23 and sensors 15.

A reference yaw rate of the vehicle 1 can be determined in box 120. In some embodiments, the reference yaw rate can be the desired yaw rate of the vehicle 1 such that the vehicle follows the desired path 17 of the turn without understeering or oversteering. The reference yaw rate can be determined based on the speed and the steering angle of the vehicle 1. The speed and steering angle can, for example, be measured by the sensors 15 or determined (estimated) by the controller 13 from other parameters measured by the sensors 15. In some embodiments of the present disclosure, the reference yaw rate can be determined based on the equation:

$$YR = \frac{(Vx)}{(L + (Ku)(Vx)^2)} * A,$$

wherein YR is the reference yaw rate, L is a measured wheel base of the vehicle 1, Vx is the longitudinal speed of the vehicle 1, A is the steering angle of the vehicle 1, and Ku is the understeer gradient of the vehicle 1. In these embodiments, the understeer gradient (Ku) is expressed in (radians times (seconds squared))/meter and can be determined by any known method.

In box 130, a first lateral force capacity of the rear left wheel 7 is determined. Similarly, in box 140 a second lateral force capacity of the rear right wheel 9 is determined. The lateral force capacity of a wheel is the amount of additional force in a lateral direction 30 that can be supported by the wheel. The lateral force capacity of a wheel can be affected by many factors including, but not limited to, vehicle speed, rotational speed of the wheel, and driving conditions (wet, icy, etc.). Additionally, the amount of slip of a wheel in a longitudinal direction 35 ("longitudinal slip") can affect the lateral force capacity of the wheel. The lateral force capacity of a wheel can be determined in many ways. In some embodiments, the lateral force capacity of a wheel can be determined based on an estimate of the slip of the wheel in a longitudinal direction 35 ("longitudinal slip value"), as further described below.

The controller 13 determines a torque control value in box 150. The torque control value can, for example, be based on the measured yaw rate of the vehicle 1 (the signal indicative of the yaw rate discussed above with regard to box 110), the reference yaw rate determined discussed above with regard to box 120 and the first and second lateral force capacities discussed above with regard to boxes 130 and 140, respectively. In some embodiments of the present disclosure, the torque control value determined in box 150 can correspond to a magnitude of the torque(s) to be delivered to the left and right rear wheels 7, 9 in order to counteract oversteer/understeer of the vehicle, limited to the level at which the torque(s) would aggravate the oversteer/understeer condition. The torque control value can then be provided to the torque vectoring mechanism 11, which can distribute torque between the left wheel 7 and the right wheel 9 based on the torque control value as is shown in box 160.

In some embodiments, the first and second lateral force capacities can be determined by analyzing the longitudinal slip values of the left and right rear wheels 7, 9. For example only, in various embodiments of the present disclosure, the first longitudinal slip value of the left rear wheel 7 and the second longitudinal slip value of the right rear wheel 9 can be determined based on the equations:

$$SL = \frac{\left(VL - \left(\frac{(VL) + (VR) - (Ym)*(Tw)}{2}\right)\right)}{\left(\frac{(VL) + (VR) - (Ym)*(Tw)}{2}\right)}, \text{ and}$$

$$SR = \frac{\left(VL - \frac{(VL) + (VR) + (Ym)*(Tw)}{2}\right)}{\left(\frac{(VL) + (VR) + (Ym)*(Tw)}{2}\right)},$$

where SL is the longitudinal slip value of the left rear wheel 7, SR is the longitudinal slip value of the right rear wheel 9, VL is the longitudinal speed of the left rear wheel 7, VR is the longitudinal speed of the right rear wheel 9, Ym is the yaw rate of the vehicle and Tw is the distance between the left and right rear wheels 7, 9.

The determined first and second longitudinal slip values can each be compared to a range of longitudinal slip values, e.g., the range between S min and S max. The range, i.e., the values for S min and S max, can be determined such that, when the longitudinal slip value of the wheel is within the range, the lateral force capacity of that wheel is greater than zero, that is, the wheel can support additional lateral force. Similarly, when the longitudinal slip value of the wheel is outside of the range, the lateral force capacity of that wheel is zero, that is, the wheel cannot support any additional lateral force. The determination of the values for S min and S max, can be determined empirically or in any other manner.

In some embodiments of the present disclosure, the method 100 described above can further include determining an initial torque control value based on the yaw rate and the reference yaw rate of the vehicle 1. The initial torque control value may correspond to the torque to be delivered to the left rear wheel 7 and/or the right rear wheel 9 in order to counteract the oversteer/understeer condition. Since these torque(s) may increase the oversteer/understeer condition, as described above, the method can further include adjusting the initial torque control value to obtain the torque control value to be applied to the torque vectoring mechanism 11. The initial torque control value can be adjusted such that the lateral force on the left rear wheel 7 does not exceed the lateral force capacity of the left rear wheel 7 and the lateral force on the right rear wheel 9 does not exceed the lateral force capacity of the right rear wheel 9. An exemplary method of determining an initial torque control value and adjusting the initial torque control value to obtain the torque control value to be utilized by the torque vectoring mechanism 11 is further described below in reference to FIG. 4.

Figure 4:
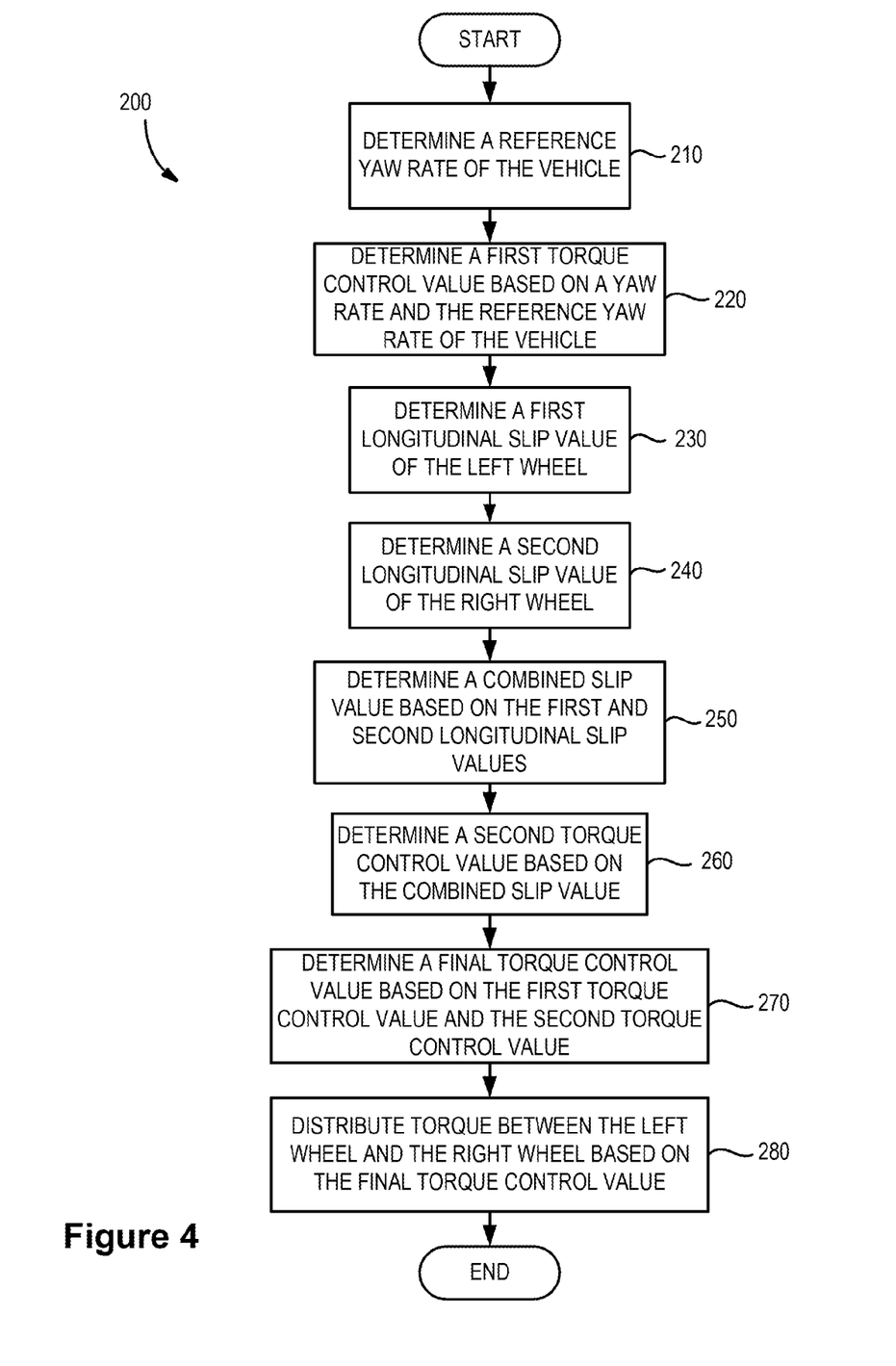
FIG. 4 is a flowchart describing another exemplary method for controlling a torque vectoring mechanism according to some embodiments of the present disclosure.

Referring now to FIG. 4, a flowchart illustrating an exemplary method 200 for controlling a torque vectoring mechanism 11 of a vehicle 1 according to some embodiments of the present disclosure is shown. The method 200 is similar to the method 100 described above and can, for example only, be performed by the controller 13 to control the torque vectoring mechanism 11 of the vehicle 1.

A reference yaw rate of the vehicle 1 can be determined in box 210. In some embodiments, the reference yaw rate can be the desired yaw rate of the vehicle 1 such that the vehicle follows the desired path 17 of the turn without understeering or oversteering. The reference yaw rate can be determined based on the speed and the steering angle of the vehicle 1. The speed and steering angle can, for example, be measured by the sensors 15 or determined (estimated) by the controller 13 from other parameters measured by the sensors 15. In some embodiments of the present disclosure, the reference yaw rate can be determined based on the equation:

$$YR = \frac{(Vx)}{(L+(Ku)(Vx)^2)} * A,$$

wherein YR is the reference yaw rate, L is a measured wheel base of the vehicle 1, Vx is the longitudinal speed of the vehicle 1, A is the steering angle of the vehicle 1, and Ku is the understeer gradient of the vehicle 1. In these embodiments, the understeer gradient (Ku) is expressed in (radians times (seconds squared))/meter and can be determined by any known method.

In box 220, a first torque control value is determined. The first torque control value can, for example, be based on the yaw rate of the vehicle 1 and the reference yaw rate determined in box 210. In some embodiments, the first torque control value can correspond to a magnitude of the torques to be delivered to the left rear wheel 7 and/or the right rear wheel 9 in order to counteract the oversteer/understeer condition, without consideration of whether these torque(s) may aggravate the condition. In some embodiments, the first torque control value can be determined based on the equation:

$$M1=K[(YR)-(Ym)],$$

wherein K is a proportionality constant, YR is the reference yaw rate, and Ym is the yaw rate vehicle 1 (for example, measured by the sensors 15).

In various embodiments of the present disclosure, the method 200 further includes determining a first longitudinal slip value of the left rear wheel 7 (box 230) and determining a second longitudinal slip value of the right rear wheel 9 (box 240). For example only, the first longitudinal slip value of the left rear wheel 7 and the second longitudinal slip value of the right rear wheel 9 can be determined based on the equations:

$$SL = \frac{\left(VL - \left(\frac{(VL)+(VR)-(Ym)*(Tw)}{2}\right)\right)}{\left(\frac{(VL)+(VR)-(Ym)*(Tw)}{2}\right)}, \text{ and}$$

$$SR = \frac{\left(VL - \frac{(VL)+(VR)+(Ym)*(Tw)}{2}\right)}{\left(\frac{(VL)+(VR)+(Ym)*(Tw)}{2}\right)},$$

where SL is the longitudinal slip value of the left rear wheel 7, SR is the longitudinal slip value of the right rear wheel 9, VL is the longitudinal speed of the left rear wheel 7, VR is the longitudinal speed of the right rear wheel 9, Ym is the yaw rate of the vehicle and Tw is the distance between the left and right rear wheels 7, 9.

In box 250, a combined slip value can be determined, e.g., by controller 13. The combined slip value can be based on the first longitudinal slip value and the second longitudinal slip value. In some embodiments, the combined slip value can be determined based on the equation:

$$SE=\max(|SeL|,|SeR|),$$

where SE is the combined slip value, |SeL| is a function of the longitudinal slip value SL of the left rear wheel 7 and |SeR| is a function of the longitudinal slip value SR of the right rear wheel 9.

The first and second error terms utilized above to determine the combined slip value can be a quantification of the comparison between the determined first and second longitudinal slip values and a range of longitudinal slip values, e.g., the range between S min and S max. As described above, the range, i.e., the values for S min and S max, can be determined such that, when the longitudinal slip value of the wheel is within the range, the lateral force capacity of that wheel is greater than zero, that is, the wheel can support additional lateral force. Similarly, when the longitudinal slip value of the wheel is outside of the range, the lateral force capacity of that wheel is zero, that is, the wheel cannot support any additional lateral force. The determination of the values for S min and S max, can be determined empirically or in any other manner. In some embodiments of the present disclosure, the first and second error terms |SeL| and |SeR| can be determined based on the equations:

$$SeL = \begin{cases} |Smax - SL| & SL > Smax \\ |Smin - SL| & SL < Smin \\ 0 & Smin \leq SL \leq Smax \end{cases}$$

$$SeR = \begin{cases} |Smax - SR| & SR > Smax \\ |Smin - SR| & SR < Smin \\ 0 & Smin \leq SR \leq Smax. \end{cases}$$

In box 260, a second torque control value is determined. The second torque control value can, for example, be based on the combined slip value determined in box 250. In some embodiments, the second torque control value can correspond to the adjustment to be made to the first torque control value such that the torque delivered to the left and right rear wheels 7, 9 does not aggravate the oversteer/understeer condition. In various exemplary embodiments, the second torque control value can be determined based on the equation:

$$M2=(KP)*(SE),$$

where M2 is the second torque control value, KP is a proportionality constant and SE is the combined slip value.

A final torque control value based on the first torque control value and the second torque control value is determined in box 270. The final torque control value can correspond to the torque(s) to be delivered to the left and right rear wheels 7, 9 in order to counteract oversteer/understeer of the vehicle, limited to the level at which the torque(s) would aggravate the oversteer/understeer condition. In some embodiments, the final torque control value can be determined based on the equation:

$$MF=(M1)-(M2),$$

where MF is the final torque control value, M1 is the initial or first torque control value and M2 is the second torque control value. The final torque control value can then be provided to the torque vectoring mechanism 11, which can distribute torque between the left rear wheel 7 and the right rear wheel 9 based on the final torque control value (box 280).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of controlling a torque vectoring mechanism that distributes torque between a left wheel and a right wheel of a vehicle, comprising:
   determining a reference yaw rate of the vehicle based on a longitudinal speed and a steering angle of the vehicle;
   determining a first torque control value based on a yaw rate of the vehicle and the reference yaw rate;
   determining a first longitudinal slip value of the left wheel;
   determining a second longitudinal slip value of the right wheel;
   determining a combined slip value based on the first longitudinal slip value and the second longitudinal slip value;
   determining a second torque control value based on the combined slip value:
   determining a final torque control value based on the first torque control value and the second torque control value; and
   distributing torque between the left wheel and the right wheel based on the final torque control value,
   wherein the final torque control value is determined based on:

$$MF = (M1) - (M2),$$

where MF is the final torque control value, M1 is the first torque control value and M2 is the second torque control value.

2. The method of claim 1, wherein the first torque control value is determined based on:

$$M1 = K[(YR) - (Ym)],$$

where M1 is the first torque control value, K is a proportionality constant, YR is the reference yaw rate and Ym is the yaw rate of the vehicle.

3. The method of claim 2, wherein the reference yaw rate is determined based on:

$$YR = \frac{(Vx)}{(L + (Ku)(Vx)^2)} * A,$$

where YR is the reference yaw rate, L is a wheel base of the vehicle, Vx is the longitudinal speed of the vehicle, Ku is an understeer gradient and A is the steering angle.

4. The method of claim 3, wherein the second torque control value is determined based on:

$$M2 = (KP) * (SE),$$

where M2 is the second torque control value, KP is a proportionality constant and SE is the combined slip value.

5. The method of claim 4, wherein the combined slip value is determined based on:

$$SE = \max(|SeL|, |SeR|),$$

where SE is the combined slip value, |SeL| is a first longitudinal slip value error of the left wheel that is a function of the first longitudinal slip value and |SeR| is a second longitudinal slip value error of the right wheel that is a function of the second longitudinal slip value.

6. The method of claim 5, wherein:
   the first longitudinal slip value error of the left wheel is determined based on:

$$SeL = \begin{cases} S\max - SL & SL > S\max \\ S\min - SL & SL < S\min \\ 0 & S\min \leq SL \leq S\max \end{cases}, \text{ and}$$

the second longitudinal slip value error of the right wheel is determined based on:

$$SeR = \begin{cases} S\max - SR & SR > S\max \\ S\min - SR & SR < S\min \\ 0 & S\min \leq SR \leq S\max. \end{cases}$$

where SL is the first longitudinal slip value, SR is the second longitudinal slip value, and S max and S min define a range of longitudinal slip values.

7. The method of claim 6, wherein:
   the first longitudinal slip value of the left wheel is determined based on:

$$SL = \frac{\left(VL - \left(\frac{(VL) + (VR) - (Ym)*(Tw)}{2}\right)\right)}{\left(\frac{(VL) + (VR) - (Ym)*(Tw)}{2}\right)}, \text{ and}$$

the second longitudinal slip value of the right wheel is determined based on:

$$SR = \frac{\left(VL - \frac{(VL) + (VR) + (Ym)*(Tw)}{2}\right)}{\left(\frac{(VL) + (VR) + (Ym)*(Tw)}{2}\right)},$$

where SL is the first longitudinal slip value, SR is the second longitudinal slip value, VL is a longitudinal speed of the left wheel, VR is a longitudinal speed of the right wheel, Ym is the yaw rate of the vehicle and Tw is a distance between the left and right wheels.

8. The method of claim 6, wherein S max and S min define the range of longitudinal slip values such that:
   when the first longitudinal slip value of the left wheel is within the range a first lateral force capacity of the left wheel is greater than zero, the first lateral force capacity being based on an estimated maximum of lateral force that can be supported by the left wheel; and
   when the second longitudinal slip value of the right wheel is within the range a second lateral force capacity of the right wheel is greater than zero, the second lateral force capacity being based on an estimated maximum of lateral force that can be supported by the right wheel.

9. The method of claim 1, wherein the reference yaw rate corresponds to a desired yaw rate of the vehicle.

10. The method of claim 1, wherein the final torque control value corresponds to distributing torque between the left wheel and the right wheel such that:
    a lateral force on the left wheel does not exceed a first lateral force capacity, the first lateral force capacity being based on an estimated maximum of lateral force that can be supported by the left wheel, and
    a lateral force on the right wheel does not exceed a second lateral force capacity, the second lateral force capacity being based on an estimated maximum of lateral force that can be supported by the right wheel.

11. A torque vectoring system, comprising:
   a torque vectoring mechanism that distributes torque between a left wheel and a right wheel of a vehicle based on a final torque control value; and
   a controller that provides the final torque control value to the torque vectoring mechanism, the controller determining the final torque control value by:
      determining a reference yaw rate of the vehicle based on a longitudinal speed and a steering angle of the vehicle;
      determining a first torque control value based on a yaw rate of the vehicle and the reference yaw rate;
      determining a first longitudinal slip value of the left wheel;
      determining a second longitudinal slip value of the right wheel;
      determining a combined slip value based on the first longitudinal slip value and the second longitudinal slip value;
      determining a second torque control value based on the combined slip value; and
      determining the final torque control value based on the first torque control value and the second torque control value,
      wherein the final torque control value is determined based on:

$MF=(M1)-(M2)$, where MF is the final torque control value, M1 is the first torque control value and M2 is the second torque control value.

12. The torque vectoring system of claim 11, wherein the first torque control value is determined based on:

$M1=K[(YR)-(Ym)]$, where M1 is the first torque control value, K is a proportionality constant, YR is the reference yaw rate and Ym is the yaw rate of the vehicle.

13. The torque vectoring system of claim 12, wherein the reference yaw rate is determined based on:

$$YR = \frac{(Vx)}{(L+(Ku)(Vx)^2)} * A,$$

where YR is the reference yaw rate, L is a wheel base of the vehicle, Vx is the longitudinal speed of the vehicle, Ku is an understeer gradient and A is the steering angle.

14. The torque vectoring system of claim 13, wherein the second torque control value is determined based on:

$M2=(KP)*(SE)$, where M2 is the second torque control value, KP is a proportionality constant and SE is the combined slip value.

15. The torque vectoring system of claim 14, wherein the combined slip value is determined based on:

$SE=\max(|SeL|,|SeR|)$, where SE is the combined slip value, |SeL| is a first longitudinal slip value error of the left wheel that is a function of the first longitudinal slip value and |SeR| is a second longitudinal slip value error of the right wheel that is a function of the second longitudinal slip value.

16. The torque vectoring system of claim 15, wherein:
   the first longitudinal slip value error of the left wheel is determined based $$SeL = \begin{cases} S\max - SL & SL > S\max \\ S\min - SL & SL < S\min \\ 0 & S\min \leq SL \leq S\max \end{cases}, \text{ and}$$

the second longitudinal slip value error of the right wheel is determined based on:

$$SeR = \begin{cases} S\max - SR & SR > S\max \\ S\min - SR & SR < S\min \\ 0 & S\min \leq SR \leq S\max. \end{cases}$$

where SL is the first longitudinal slip value, SR is the second longitudinal slip value, and S max and S min define a range of longitudinal slip values.

17. The torque vectoring system of claim 16, wherein:
the first longitudinal slip value of the left wheel is determined based on:

$$SL = \frac{\left(VL - \left(\frac{(VL)+(VR)-(Ym)*(Tw)}{2}\right)\right)}{\left(\frac{(VL)+(VR)-(Ym)*(Tw)}{2}\right)}, \text{ and}$$

the second longitudinal slip value of the right wheel is determined based on:

$$SR = \frac{\left(VL - \frac{(VL)+(VR)+(Ym)*(Tw)}{2}\right)}{\left(\frac{(VL)+(VR)+(Ym)*(Tw)}{2}\right)},$$

where SL is the first longitudinal slip value, SR is the second longitudinal slip value, VL is a longitudinal speed of the left wheel, VR is a longitudinal speed of the right wheel, Ym is the yaw rate of the vehicle and Tw is a distance between the left and right wheels.

18. The torque vectoring system of claim 16, wherein S max and S min define the range of longitudinal slip values such that:
   when the first longitudinal slip value of the left wheel is within the range a first lateral force capacity of the left wheel is greater than zero, the first lateral force capacity being based on an estimated maximum of lateral force that can be supported by the left wheel; and
   when the second longitudinal slip value of the right wheel is within the range a second lateral force capacity of the right wheel is greater than zero, the second lateral force capacity being based on an estimated maximum of lateral force that can be supported by the right wheel.

19. The torque vectoring system of claim 11, wherein the reference yaw rate corresponds to a desired yaw rate of the vehicle.

20. The torque vectoring system of claim 11, wherein the final torque control value corresponds to distributing torque between the left wheel and the right wheel such that:
   a lateral force on the left wheel does not exceed a first lateral force capacity, the first lateral force capacity being based on an estimated maximum of lateral force that can be supported by the left wheel, and
   a lateral force on the right wheel does not exceed a second lateral force capacity, the second lateral force capacity being based on an estimated maximum of lateral force that can be supported by the right wheel.

\* \* \* \* \*

UNITED STATES PATENT AND TRADEMARK OFFICE
CERTIFICATE OF CORRECTION

PATENT NO. : 8,589,048 B2
APPLICATION NO. : 13/220854
DATED : November 19, 2013
INVENTOR(S) : Gabriel Per Erik Ivar Trönnberg et al.

It is certified that error appears in the above-identified patent and that said Letters Patent is hereby corrected as shown below:

In the Claims

Column 11, Line 17, Claim 1, "value:" should be --value;--

Column 12, Line 12-14, Claim 6, $$SeR = \begin{cases} S\max - SR & SR > S\max \\ S\min - SR & SR < S\min \\ 0 & S\min \leq SR \leq S\max \end{cases}$$

should be $$SeR = \begin{cases} S\max - SR & SR > S\max \\ S\min - SR & SR < S\min \\ 0 & S\min \leq SR \leq S\max \end{cases}$$

Column 13, Line 67, Claim 16, "based", should be --based on:--

Column 14, Line 12-14, Claim 16, $$SeR = \begin{cases} S\max - SR & SR > S\max \\ S\min - SR & SR < S\min \\ 0 & S\min \leq SR \leq S\max \end{cases}$$

should be $$SeR = \begin{cases} S\max - SR & SR > S\max \\ S\min - SR & SR < S\min \\ 0 & S\min \leq SR \leq S\max \end{cases}$$

Signed and Sealed this
Fifteenth Day of April, 2014

Michelle K. Lee
*Deputy Director of the United States Patent and Trademark Office*